May 12, 1936.  H. F. WATKINS  2,040,114

FRUIT JUICE EXTRACTING MACHINE

Filed May 31, 1933  5 Sheets-Sheet 1

FIG_1_

INVENTOR.
Harold F. Watkins
BY
White, Prost, Fuhr & Lothrop
ATTORNEYS.

May 12, 1936.　　　　　H. F. WATKINS　　　　　2,040,114
FRUIT JUICE EXTRACTING MACHINE
Filed May 31, 1933　　　5 Sheets-Sheet 3

FIG_3_

FIG_4_

INVENTOR.
Harold F. Watkins
BY
White, Prost, Flehr & Lothrop
ATTORNEYS.

May 12, 1936.  H. F. WATKINS  2,040,114

FRUIT JUICE EXTRACTING MACHINE

Filed May 31, 1933   5 Sheets-Sheet 5

FIG_7.  FIG_8.  FIG_9.

FIG_10.  FIG_11.

FIG_12.

INVENTOR.
Harold F. Watkins
BY
White, Prost, Flehr & Lothrop
ATTORNEYS.

Patented May 12, 1936

2,040,114

UNITED STATES PATENT OFFICE 2,040,114

FRUIT JUICE EXTRACTING MACHINE

Harold F. Watkins, Oakland, Calif., assignor to Watkins Fruit Machinery Company, San Francisco, Calif., a corporation of California Application May 31, 1933, Serial No. 673,585

7 Claims. (Cl. 146—3)

This invention relates generally to machines for the extraction of juices from various fruits, particularly citrous fruits such as oranges, grapefruit and lemons.

It is an object of the invention to provide a machine of the above character which will function entirely automatically, and which in its use will afford a material saving over hand operated methods and devices for extracting fruit juice.

A further object of the invention is to provide a fruit juice extractor which will afford a relatively high recovery of juice, and which will enable production of a fruit juice of higher quality than is obtainable by prior methods. In this connection the present invention will not cause the extracted juice to be contaminated to a material degree by undesired oil or material from the fruit peel or pith, or to be seriously oxidized by contact with air.

A further object of the invention is to improve machines of the above character whereby a relatively high capacity is afforded for a machine of given size and cost, and whereby the machine will operate with a high degree of uniformity and reliability.

Another object of the invention is to provide a machine which can be operated upon a variety of different types and grades of fruit, to extract the juice therefrom.

Further objects of the invention will appear from the following description in which the preferred embodiment of the invention has been set forth in detail in conjunction with the accompanying drawings.

Referring to the drawings.

Figure 1:
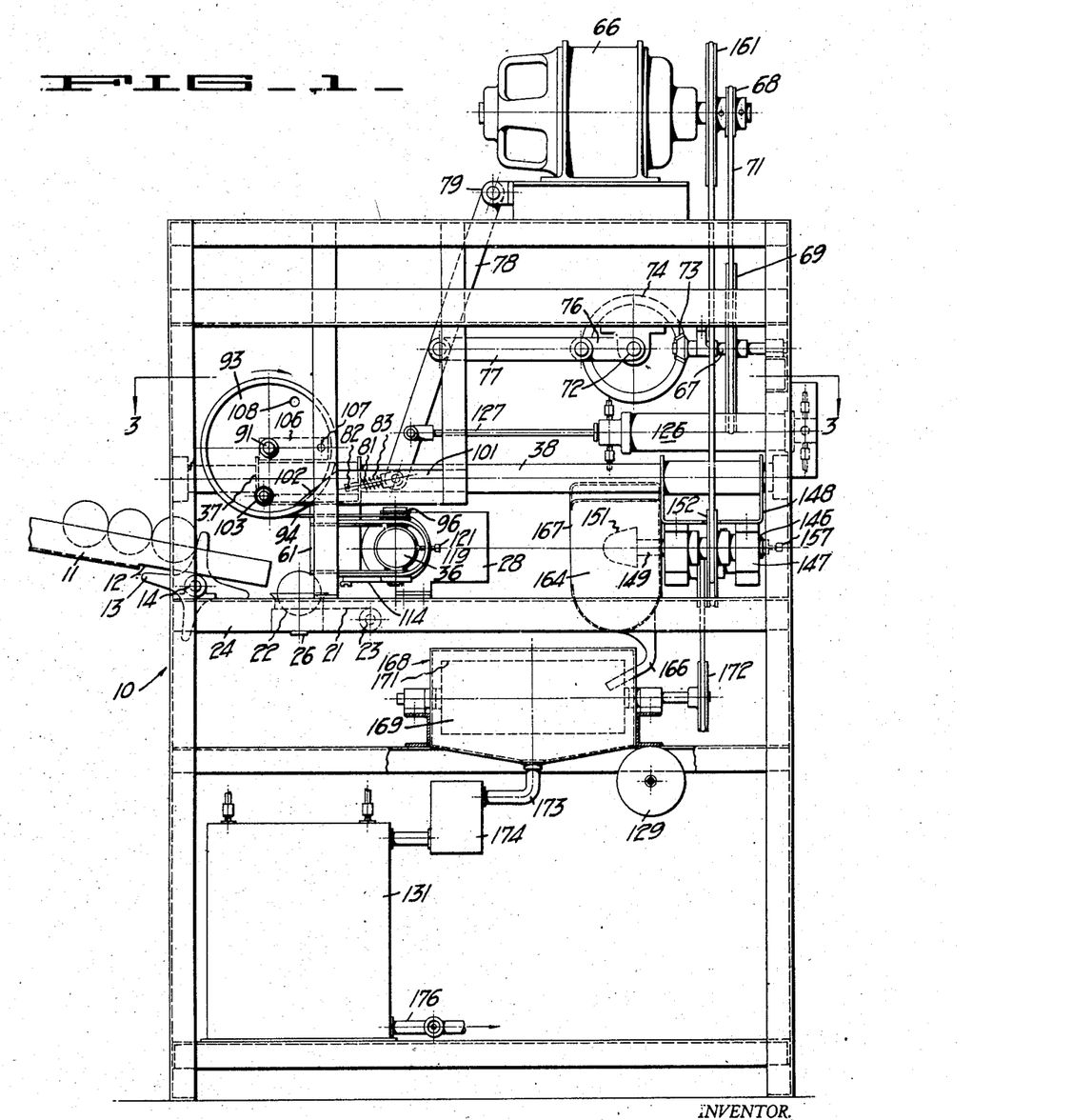
Figure 1 is a side elevational view, illustrating a machine incorporating the present invention.
Figure 2:
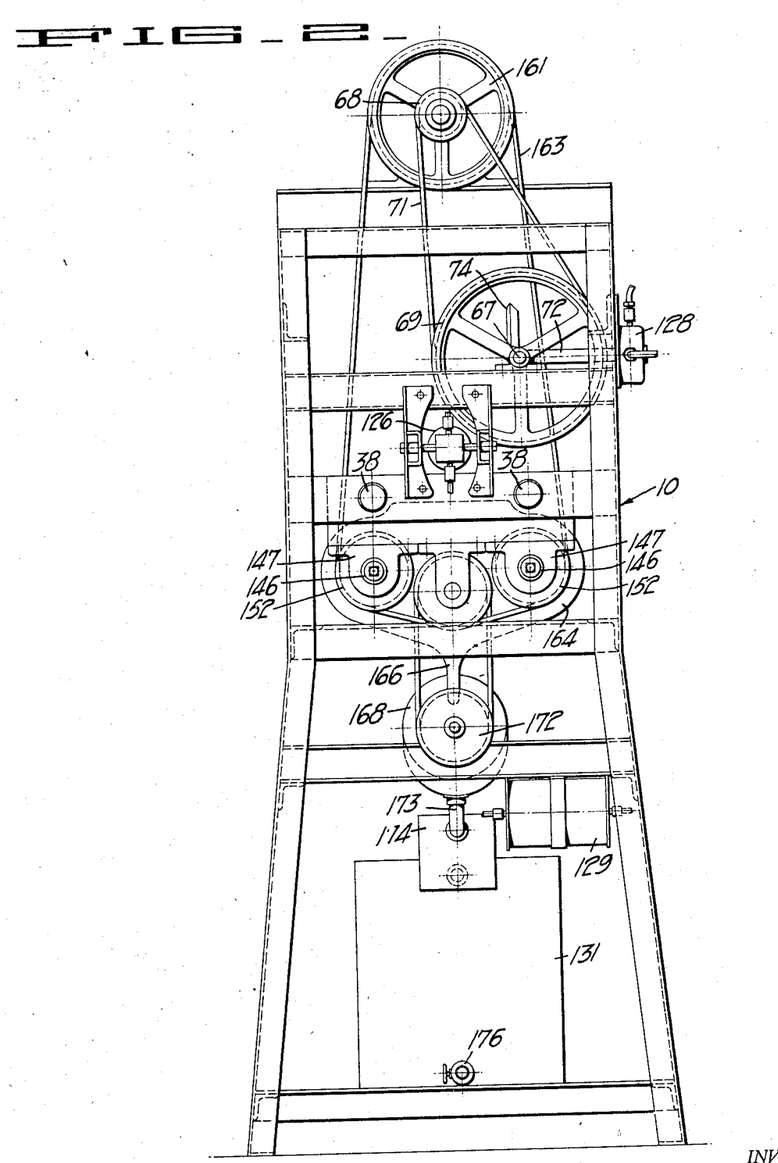
Fig. 2 is an elevational assembly view looking towards the right hand end of the machine illustrated in Fig. 1.
Figure 3:
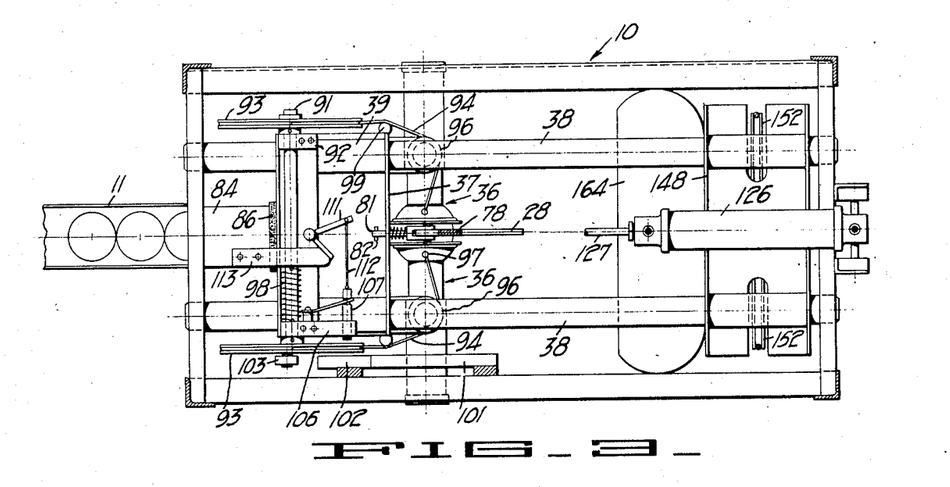
Fig. 3 is a cross sectional detail taken along the line 3—3 of Fig. 1.

Referring first to Figs. 1 to 3 inclusive, the machine as illustrated has its operating parts carried by a frame 10 formed of suitable structural members. The operating elements carried by the frame serve to feed articles of fruit successively to the machine, and as the articles of fruit are received, they are halved, and the individual parts or halves of the fruit are then engaged by duplex fruit handling devices. These fruit handling devices carry the halved parts of the fruit into operative engagement with a pair of rotatable burrs, which serve to extract fruit juices. At the completion of this operation, the peels are expelled and the fruit handling devices are then returned to engage the succeeding article of fruit from which juice is to be extracted.

The means disclosed for feeding the articles of fruit one by one to the machine, consists of an inclined trough 11, to which the articles of fruit can be supplied. The lower end of trough 11 is provided with a slot 12, to accommodate a star wheel 13. Star wheel 13 is carried by rotatable shaft 14, and is biased, as by means of a suitable spring, in a direction which tends to rotate the wheel in a counterclockwise direction as viewed in Fig. 1.

In order to oscillate star wheel 13, I have shown a lever 16 which is pivotally carried by the frame of the machine, and which is adapted to be oscillated by engagement with an actuating bar 17. As will be presently explained, actuating bar 17 is carried by another part of the machine, which is cyclically reciprocated in a general horizontal direction. Fixed to shaft 14 there is an arm 18, which is provided with a pin and slot connection 19 to the lower extension of lever 16. Therefore when lever 16 is released by retraction of bar 17, star wheel 13 is permitted to rotate one-quarter revolution in a counterclockwise direction. When lever 16 is engaged by bar 17, the swinging movement imparted to it rotates star wheel 13 in a clockwise direction one-quarter revolution, to discharge one article of fruit from the lower end of the trough 11.

As an article of fruit is delivered from the lower end of trough 11, it is received by means which impales the fruit upon a suitable knife. Thus referring to Fig. 4, an oscillating arm 21 is provided, which has a frusto-conical shaped fruit receiving cup 22 mounted upon its free end. Arm 21 is carried by a shaft 23, which in turn is journaled to the horizontal structural elements 24 of the machine frame. A stop 26 limits swinging movement of arm 21 in a counterclockwise direction. It will be noted that cup 22 is so located with respect to the lower end of trough 11, that as an article of fruit drops from the lower end of this trough, it is received by cup 22 and centered by gravity. Arm 21 is normally biased toward the fruit receiving position illustrated in Fig. 4, as by means of a spring 27. Another spring 25 serves to connect arm 21 with a reciprocating carriage 37.

Figure 4:
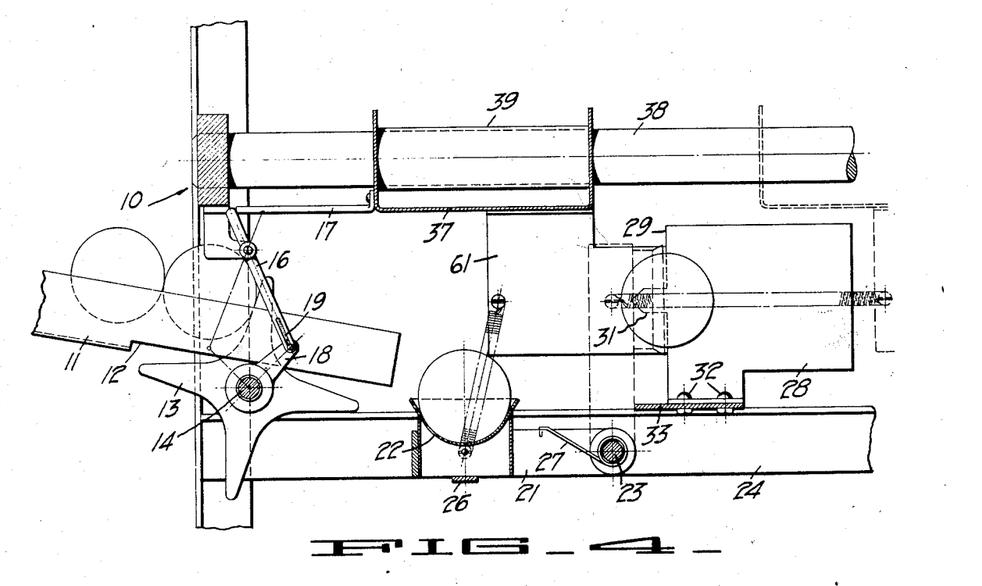
Fig. 4 is an enlarged detail in cross section, illustrating particularly the means disclosed for successively feeding fruit to the machine.

In the operation of the machine, arm 21 together with cup 22 is swung to the position illustrated in dotted lines in Fig. 4, to impale the article of fruit upon a knife 28. Knife 28 is in the form of a blade arranged in a plane normal to the axis of shaft 23 and intersecting the cup 22. The forward edges 29 of this blade are sharpened, and a spear head 31 with sharpened edges is arranged to pierce substantially thru the center of the fruit. The blade is mounted by suitable means, such as bolts 32 which attach the same to a cross-bar 33, which in turn is mounted upon the structural members 24. As will be presently explained, after an article of fruit has been received within cup 22, and centered by gravity, arm 21 is swung to the position illustrated in dotted lines in Fig. 4 during operation of the machine, to impale the fruit upon knife 28, in the manner illustrated. Upward swinging movement of arm 21 is shown limited by a suitable stop, such as one edge of plate 33. It will be noted that the impaling of the fruit upon the knife 28 partially but not completely serves the fruit into two halves. A sufficient amount of the fruit peel remains unsevered, to retain the fruit upon the knife, after arm 21 drops back to its initial position.

The fruit handling devices, which grip the two halves of the fruit impaled upon blade 28, and which carry the two halves into engagement with burrs for extracting juice from the same, have been designated generally at 36. These devices are supported by carriage 37, which in turn is adapted to reciprocate longitudinally of the plane of blade 28. The particular mounting illustrated for carriage 37, to enable its desired reciprocating movement, consists of a pair of parallel guide tubes 38 extending in a horizontal direction, and which have their ends secured to the main frame of the machine. Sleeves 39 serve to slidably engage tubes 38, and are in turn secured to the carriage 37. Actuating rod 17, which as has been previously explained serves to actuate the star wheel 13, is secured to carriage 37 as illustrated in Fig. 4. While the fruit handling devices 36 may vary as to detail, the construction as illustrated is as follows:—Each device consists of an outer tubular shell 41, having an end closure 42. Slidably fitted within tubular shell 41, there is a tube or sleeve 43. Fixed to the outer end of tube 43 as by means of a threaded connection, there is a cup 44 formed of metal or other rigid material. Suitable means such as a compression spring 46 normally urges the inner tube 43 toward an extended position with respect to the outer shell 41. Within the metal cup 44 there is a liner 47 made of resilient material, such as soft vulcanized rubber. Formed upon the interior side of liner 47 are a plurality of annular pliable ribs 48. These ribs preferably taper inwardly to a relatively thin edge, and serve to facilitate an air-tight contact with the surface of the fruit being handled. The center portion of liner 47 is apertured to accommodate a clamping bolt 49. This bolt is shown ported as indicated in 51, to afford communication between the interior of the cup and an air tube 52. It will be noted that there is considerable space between liner 47 and the inner walls of the metal cup 44, to enable the liner to accommodate itself to the contour of the article of fruit being gripped. Sliding movement of the inner tube 43, with respect to the outer shell 41, is shown limited by means of a screw 53, accommodated within a longitudinal slot 54 formed in shell 41.

For mounting each of the devices 36 with respect to the carriage 37, each of the shells 41 is shown provided with a pair of alined stud shafts 56 and 57. These studs are shown journaled to the upper and lower branches 58 and 59 of a depending bracket 61, which in turn is secured to and may be considered as forming a part of carriage 37. With the particular form of machine assembly illustrated the axis of studs 56 and 57 is vertical, so that the pivotal movement afforded each of the devices 36 with respect to carriage 37, is in a horizontal plane.

Before explaining the manner in which the fruit handling devices 36 are actuated, I shall first explain briefly the mechanism illustrated for effecting reciprocation of the carriage 37. Mounted upon the main frame of the machine there is a suitable source of power, such as an electric motor 66. This motor serves to drive a counter shaft 67, thru pulleys 68 and 69, and belt 71, or like drive connection. Journaled upon the frame of the machine there is also a crank shaft 72, which is driven from countershaft 67, thru pinion 73 and bevel gear 74. Fixed to the shaft 72 there is a crank arm 76, which is connected by a link 77 to a lever 78. Lever 78 has a suitable pivotal connection 79 with the frame of the machine, as for example to the base for motor 66. Pivotally connected to the lower end of lever 78, there is a pin 81 which extends thru an aperture in a portion of carriage 37. The free end of pin 81 is provided with a latch member 82 to retain an operating connection to the carriage, and the pin is surrounded by a compression spring 83 to somewhat cushion the drive connection thus afforded. Movement of the carriage to the left as viewed in Fig. 1 can be definitely limited by a stop 84 (Fig. 3) which can be provided with a buffer or cushion 86. It is evident that during operation of motor 66, crank shaft 72 is continuously rotated, whereby swinging movement of lever 78 causes repeated reciprocation of the carriage 37.

The actuating means shown for the fruit handling devices 36 includes a shaft 91, which extends transversely to the path of movement of the carriage 37, as shown in Figs. 1 and 3. The journals 92 for shaft 91, are mounted upon the carriage 37. Secured to the ends of shaft 91 are the pulley wheels 93, which are engaged by flexible cords or cables 94. The upper stud shaft 56 of each of the fruit handling devices 36 is provided with a pulley 96, and the cord 94 from the corresponding pulley 93 passes over this pulley 96, and has its terminal attached to the metal cup 44 as indicated at 97. A helical spring 98 surrounding shaft 91 normally tends to rotate this shaft and the pulley 93 in a clockwise direction as viewed in Fig. 1, thus serving to maintain cords 94 continuously tensioned.

In order to positively rotate the pulleys 93 in a clockwise direction as viewed in Fig. 1, I provide a cam bar 101, which is fixed to the frame of the machine, and which is provided with inclined cam face 102. Mounted upon the outer face of the adjacent pulley 93, there is a pin carrying a roller 103. Normally roller 103 is in a lowered position as shown in Fig. 1. However when the carriage 37 moves to the right as viewed in this figure, roller 103 engages the cam surface 102, thus causing pulleys 93 to be rotated a given angular amount, after which upon further movement of carriage 37 to the right, roller 103 rides upon top of the cam bar 101, during which time pulleys 93 remain relatively stationary with respect to the carriage.

Figures 10, 11:
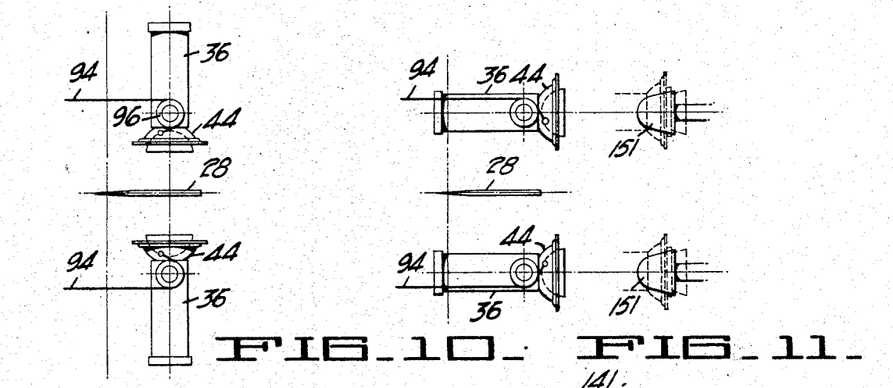

Rotation of pulleys 93 by the cam bar 101, while the carriage 37 is moving to the right as viewed in Fig. 1, by pulling upon cords 94, serves to rotate the fruit handling devices 36 in opposite directions (Fig. 3) and at the same time to retract metal cups 44 with respect to the outer shell 41. When each of the handling devices are rotated thru substantially 90 degrees, further rotation is arrested. When in such positions the cups 44 face the direction of movement of the carriage 37; in other words the longitudinal axis of the two handling devices are shifted from a position of substantial alinement (Fig. 3), to positions in which these axes are substantially parallel to each other and parallel to the direction of movement of carriage 37 (Fig. 11). This movement will be subsequently explained in greater detail in connection with Figs. 7 to 11 inclusive. During the return movement of the carriage 37, it is desirable to retain the two handling devices substantially parallel until the end of the reciprocating movement, at which time these devices are rotated into substantial alinement, comparatively rapidly, and the metal cups 44 then released to permit extending movement toward each other with considerable rapidity compared to the rate with which these cups are retracted. To secure such snap action near the end of the cycle of operations, I provide means for locking pulleys 93, after these pulleys have been rotated to a predetermined degree by the axis of cam bar 101, and for releasing these pulleys near the end of reciprocating movement of the carriage 37 to the left as viewed in Fig. 1. To accomplish this result, mounted upon the carriage 37 adjacent one of the pulleys 93, there is an arm or bracket 106, carrying a slidable lock pin 107 (Fig. 3). For one angular position of the adjacent pulley 93, lock pin 107 is adapted to engage within an aperture 108 (Fig. 1). Pin 107 is urged in a direction toward the adjacent pulley 93, by means of leaf spring 109. In order to move pin 107 to released position, an L-lever 111 is provided, which has its one arm connection to pin 107 by cable or cord 112. The L-lever 111 is pivotally mounted upon the carriage 37. Its other arm is adapted to engage a trip bar 113, which is carried by stationary part of the machine. Near the end of the movement of the carriage toward the left (Fig. 3) L-lever 111 is actuated by engagement with trip bar 113, to move pin 107 to disengaged position, thus releasing pulleys 93 and permitting the fruit handling devices 36 to snap back to their original positions. Likewise, when the carriage moves toward the right as viewed in Fig. 3, and when roller 103 has attained the upper edge of cam bar 101, pin 107 is permitted to engage within aperture 108. With this arrangement it is evident that while cam bar 101 determines the nature of the angular movement of pulley wheels 93 while the carriage is moving to the right, the release of pin 107 determines the return angular movement at the end of the return stroke of the carriage.

Figure 5:
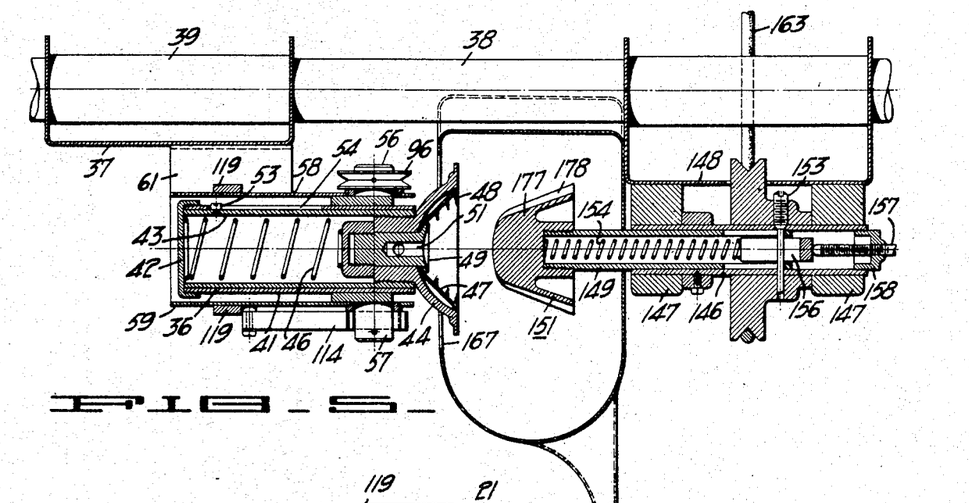
Fig. 5 is an enlarged cross sectional view, showing one of the fruit handling devices in detail and also showing in detail the mounting for one of the rotatable burrs for operating upon one part of a halved article of fruit.

It has been explained that rotation of pulley wheels 93 in a clockwise direction as viewed in Fig. 1, while the carriage is moving to the right, causes the fruit handling devices 36 to be swung from a position in which their axes are in substantial alinement, to a position in which their axes are spaced and substantially parallel. To insure proper return movement of each of the fruit handling devices, when pulleys 93 are released by retraction of pin 107, I provide suitable means such as a spring 114 (Fig. 5). This spring is coiled about stud 57, with its one end anchored to the stud and its other end anchored to the branch portion 59 for bracket 61.

While the fruit handling devices are positioned with their axes parallel and spaced apart, it is desirable to have the metal cups 44 retracted with respect to the associated shells 41. However, when the fruit handling devices are swung inwardly in opposite directions thru 90 degrees, to bring their axes into substantial alinement, the cups 44 are projected into engagement with the opposite sides of an article of fruit. To make possible these operations, latch means is provided in conjunction with each fruit handling device for retaining the metal cups 44 retracted and for releasing these cups for projecting movements towards each other upon opposite sides of the fruit, at the end of the swinging movement, into the position illustrated in Fig. 3. Thus, as shown more clearly in Fig. 6, each of the fruit handling devices is provided with a latch 116, which is pivotally carried by shell 41 and which has an inturned end portion 117 adapted to engage within an aperture 118 formed in one side wall of the inner tube 43. When cup 44 is retracted, latch 116 snaps into engagement with aperture 118, and thus retains tube 43 and cup 44 retracted with respect to the outer shell 41, against the pressure of compression spring 46. In order to automatically release latch 116 there is shown a yoke (Fig. 6) which is carried by the spaced portions 58 and 59 of bracket 61. Carried by yoke 119 there is a set screw 121 adapted to engage and release latch 116 when the fruit handling device is swung thru an angle of 90 degrees. In other words, as viewed in Fig. 6, when the two fruit handling devices are swung from the positions illustrated in this figure, to positions in which their axes are in substantial alinement, latches 116 are actuated to release their engagement with the inner tubes 43, thus permitting the cups 44 to be projected towards each other under the urge of compression spring 46.

Figure 12:
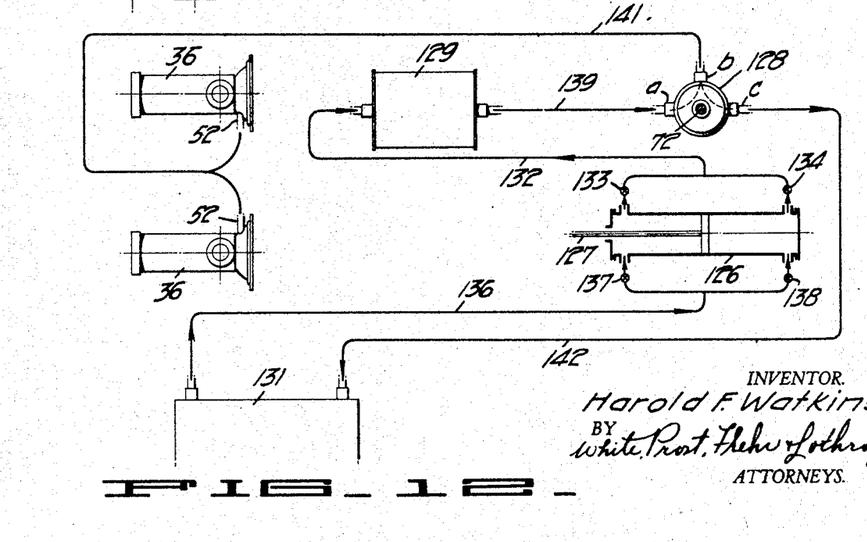
Fig. 12 is a diagrammatic view, illustrating the manner in which the vacuum and pneumatic pressure is alternately and cyclically applied to the fruit handling devices.

In conjunction with the fruit handling devices 36, I provide means for applying a vacuum to the interior of cups 44 when these cups are projected upon opposite sides of an article of fruit impaled upon blade 28. This vacuum is maintained until after a juicing operation, at which time pneumatic pressure is applied to positively expel the peel. While the vacuum and the pneumatic pressure may be supplied from extraneous sources, by apparatus operating independently of my machine, it is convenient to incorporate such apparatus in the machine itself. Thus, for this purpose I have shown a cylinder 126 mounted upon the frame of the machine, the inner piston of which is connected to a packed rod 127. Rod 127 is in turn connected to lever 78, so that it is reciprocated in synchronism with reciprocation of the main carriage 37. Alternate application of vacuum and pneumatic pressure to the fruit handling devices is controlled by a suitable distributing valve 128 (Fig. 2). The movable member of this valve is rotatable and is shown operatively connected directly to the crank shaft 72. In conjunction with pneumatic cylinder 126 and the distributing valve 128, I provide a pressure tank 129 and a vacuum tank 131 (Fig. 12). A connection between pressure tank 129 and cylinder 126 is established thru flow line 132 and the check valves 133 and 134. Connections to the vacuum tank 131 are established thru flow line 136 and the check valves 137 and 138. Distributing valve 128 is provided with three points of connection lettered A, B, and C. Line 139 connects pressure tank 129 with point A of the distributing valve. Point B on the distributing valve is connected by line 141 with the tubes 52 of the two fruit handling devices 36. Note that a portion of this connection adjacent the fruit handling devices is formed by flexible hose sections 141a (Fig. 6) to accommodate the movements of the fruit handling devices during operation of the machine. The point of connection C of the distributing valve 128 communicates with the vacuum tank 131 thru flow line 142.

Distributing valve 128 has three main operating positions. In one position, points of connection B and C are placed in communication, whereby air is sucked thru flow lines 141 and 142 to the vacuum tank 131, and whereby vacuum is applied to the fruit handling device 36. At this time flow line 139 is closed. In its second position communication is established between the points of connection A and B, so that pneumatic pressure from tank 129 is permitted to flow thru lines 139 and 141 to the fruit handling devices. At this time communication between points of connection A and B, with respect to the point of connection C, is interrupted. In the third operating position of the distributing valve 128 communication is interrupted between the points of connection A and C, and also with respect to both points A and C and point B. At such times atmospheric pressure exists within the flow line 141. Continuous reciprocation of the piston in cylinder 129 during operation of the machine insures continuous maintenance of a pressure substantially above atmospheric in tank 129, and a vacuum considerably below atmospheric in tank 131. If desired, these tanks can be provided with suitable relief valves in order to prevent the pressure from becoming excessive, or the vacuum from becoming too high.

I shall now describe the parts of the machine which operate upon the parts of the halved fruit as held by the fruit handling devices, to extract juice therefrom. A pair of spaced parallel tubular shafts 146 are provided, which are carried by journal blocks 147. The journal blocks in turn are shown carried by a suitable support such as a hanger 148, secured to the guide tubes 38. Slidably fitted within the shafts 146, are the tubes 149, upon the outer ends of which are mounted the rotatable reaming burrs 151. A drive pulley 152 is disposed upon each of the shafts 146, and is locked thereto by pin 153. The inner end of each tube 149 is slotted to accommodate pin 153, thus forming a splined drive connection. Arranged within each of the tubes 149 there is a compression spring 154. One end of this spring seats against burr 151, and the other end seats upon a slidable forked follower 156. For adjusting the position of follower 156 and thus the pressure upon spring 154, a threaded rod 157 is provided, which is threaded thru an end plug 158. With this assembly each of the burrs 151 is always urged in one direction by the compression spring 154. When a halved article of fruit is forced upon burr 151, this burr may give a certain amount against the compression spring 154. The drive connection to burrs 151 can best be explained by reference to Fig. 2. Thus mounted upon the shaft of motor 66 there is a pulley 161, which is connected to pulleys 152 by belt 163.

In order to collect the juice extracted by the operation of burrs 151, these burrs are enclosed by a suitable receiver 164, provided with a lower discharge spout 166. The front of receiver 164 is provided with an opening 167 to amply accommodate the cups 44 of the fruit handling devices. It is desirable to convey the juice collected by receiver 164 directly to a strainer 168. This strainer as illustrated consists of a housing 169 within which there is a rotary drum screen 171. A pulley 172 is attached to the shaft of this screen, and this pulley likewise is driven by the drive belt 163. The strained juice can be removed thru pipe 173 and after passing thru a trap 174, is delivered to the vacuum tank 131. With this arrangement for handling the juice there is less opportunity for contact with the air with resultant oxidation. From tank 131 the juice can be removed thru pipe 176.

Figures 6, 13:
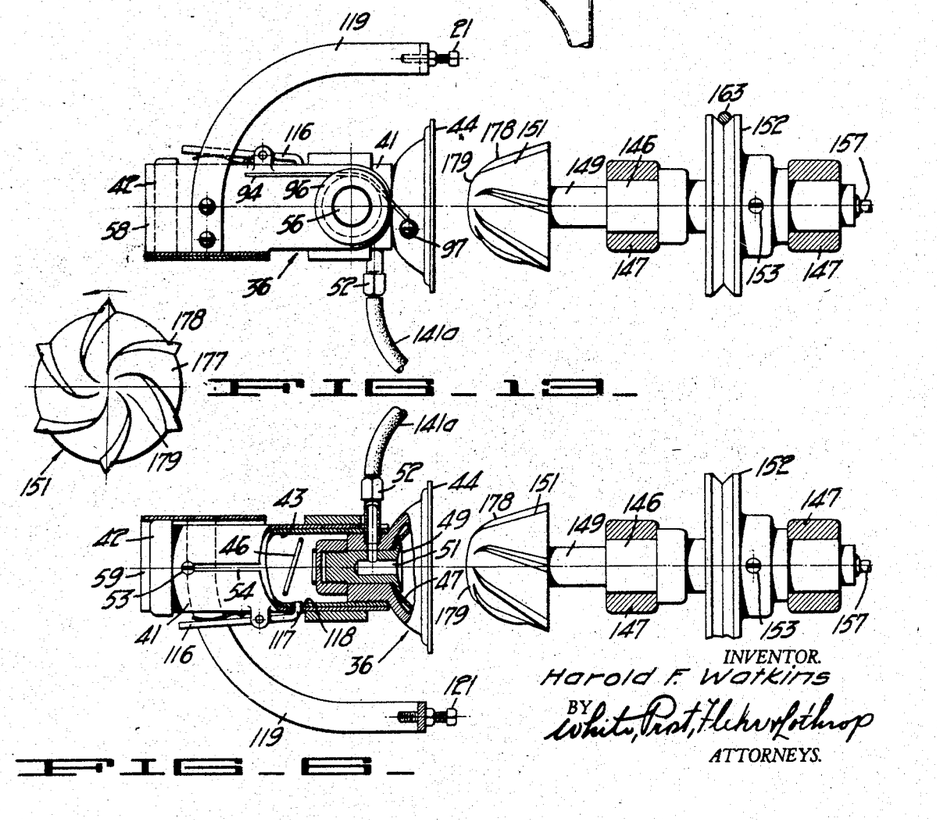
Fig. 6 is a plan detail, partly in cross section, showing both of the fruit handling devices, together with the rotatable burrs with which they cooperate.
Fig. 13 is a detail view of one end of one of the reaming burrs.

A suitable form of burr which has given good results is shown in Fig. 13. The outer surface of the burr body 177, is provided with helicoidal ribs 178. These ribs merge with the rounded end surface 179 and this end surface is interrupted by shallow grooves. A burr of this character will not tend to grind away a portion of the peel because of the manner in which the ribs 178 merge with the rounded end surface 179, although an efficient extracting action is afforded.

Figure 7:
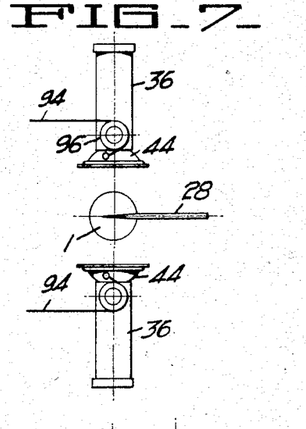
Figs. 7 to 11 inclusive illustrate diagrammatically the manner in which the fruit handling devices operate, to present parts of a halved article of fruit to the reaming burrs.
Figure 8:
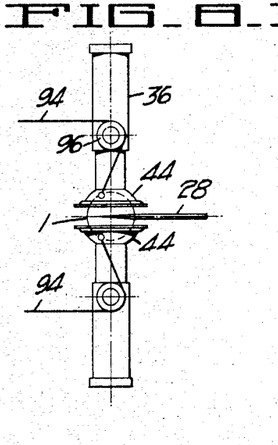
Figure 9:
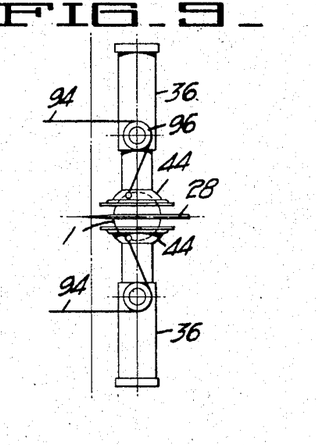

Operation of the machine as a whole is as follows:—As has been previously explained during each reciprocation of the carriage 37 an article of fruit is carried upwardly by arm 21 and impaled upon the blade 28. The position of the fruit, which has been designated by numeral 1, after impalement, is shown in Fig. 7. It will be noted that it is substantially in alinement with the line of centers between the fruit handling devices, when these devices are turned so that their axes are in alinement. The article of fruit occupies such an impaled position when carriage 37 returns to its left hand limit, as viewed in Fig. 1. The cycle of operation, particularly with respect to the fruit handling devices, will be presumed to start immediately before the carriage moves entirely to its left hand limit as viewed in Fig. 1, or in other words immediately after pulley wheels 93 have been released by retraction of pin 107, and at the instant that latch 116 is being released by engagement with set screws 121. The fruit handling devices 36 at that instant are in alinement as shown in Fig. 7, with the metal cups 44 facing toward each other. Immediately upon release of latches 116, cups 44 move toward each other under the pressure of springs 46, and engage the opposite sides of the fruit 1 as shown in Fig. 8. At substantially the same time distributing valve 128 reaches a position in which a vacuum is applied to cups 44. The liners 47 for these cups seal upon the surfaces of the fruit, so that the two halves of the fruit are gripped with considerable force. Thereafter and while the vacuum is maintained, carriage 37, together with the fruit handling devices, moves toward the right as viewed in Fig. 1, or in other words in a general direction towards the burrs 151. The extent of this movement will be seen by comparing Figs. 8 and 9. During this movement the two halves of the fruit 1 are completely severed by the knife 28. During the further reciprocating movement of the carriage from the position indicated in Fig. 9 to that indicated in Fig. 10, pulley wheels 93 are being rotated a certain angular amount by virtue of engagement of roller 103 with the inclined end face of cam bar 101, and the pulling upon cables 94 first causes retraction of cups 44. Thus in Fig. 10, the cups are shown fully retracted and gripping the two halves of the severed fruit. During the next portion of the movement of the carriage from the position indicated in Fig. 10 to that indicated in Fig. 11, there occurs a final pulling movement of cables 94 which causes both of the fruit handling devices to be rotated thru 90 degrees in opposite directions, to the position shown in Fig. 11. During the final portion of the reciprocating movement of the carriage towards the burrs 151, the fruit handling devices remain substantially as shown in Fig. 11. However these devices are advanced sufficiently far to bring the open face of the fruit halves into engagement with burrs 151. While the halves of the fruit are being pressed upon burrs 151, these burrs give a certain amount, and therefore the net pressure between each burr and the fruit half being juiced, is determined by the pressure exerted by spring 154. Likewise other factors being constant, the rate with which each burr advances into the fruit, is determined largely by the pressure of these springs. In Fig. 11, dotted lines show the position of the fruit handling devices when the carriage is at the end of its travel across the burrs with the burrs operating within the fruit halves. It will also be noted that the dotted lines show the burrs being forced backwardly a certain amount against pressure of springs 154. Following operation of the burrs upon the fruit halves, the return movement of the carriage is commenced, and when the fruit handling devices reach approximately the position illustrated in Fig. 11 in solid lines, the distributing valve 128 is positioned to apply pneumatic pressure to expel the peels. Near the end of the return movement of the carriage, pin 107 is disengaged with respect to the adjacent pulley wheel 93, thus permitting the fruit handling devices to rotate rapidly thru 90 degrees. Immediately upon completion of this rotating movement latches 116 of the fruit handling devices are tripped, to cause the metal cups 44 to be projected into engagement with opposite sides of the next article of fruit, which in the meantime has been impaled upon blade 28.

The advantages afforded by the various features of my machine will be evident. Operation is entirely automatic, without the necessity of contacting the juice with the human hands. The burrs act to squeeze away the juice with a minimum cutting away of the fruit pith or webbing. Thus while the pith or webbing is flattened out upon the inner surface of the peel, it is not cut or torn away, so that substantially all of the pith or webbing remains with the peel and does not contaminate the juice. The speed with which the burrs advance into the fruit depends upon a number of factors, in addition to the pressure exerted by springs 154. Other factors are the speed of rotation of the burrs, and the design of the burrs. These factors should all be such that the burrs remove the juice effectively with a minimum amount of cutting or tearing away of the webbing, pith or peel, and with a minimum number of turns of the burrs after the available juice has been removed. If any oil is removed from the peel it is retained by the vacuum cups and is not permitted to contaminate the juice.

With respect to minimizing oxidation by contact with air, it is evident that all the working parts of my machine can be enclosed within a housing, in which an atmosphere of inert gas such as nitrogen can be maintained.

The vacuum cups will readily grip the surfaces of the fruit being handled, irrespective of the surface contour presented. In this connection note that the liners 47 are sufficiently flexible as to be pulled against the fruit surfaces by vacuum, rather than to accommodate for varying contours by varying degrees of compression of the rubber. While cups of a given size will accommodate fruit of varying sizes, if desired cups of various sizes can be provided to extend the range of usefulness of the machine. Likewise various sized burrs can be provided so that the operator may select burrs of a size commensurate to the size of fruit being juiced.

It is evident that many modifications can be made within the spirit of my invention. For example, the vacuum cups can be retracted and projected pneumatically rather than mechanically. Likewise the fruit handling devices can be pivotally mounted upon a fixed support, with means for projecting the vacuum cups toward the burrs after the fruit handling devices have been swung into alinement.

I claim:

1. In a fruit juice extractor, a pair of spaced rotary burrs, a carriage adapted to reciprocate toward and away from said burrs, a pair of fruit handling devices supported by said carriage, each of said handling devices including a pair of parts slidably connected together, a vacuum cup carried by one of said parts, and a pivotal connection between the other of said parts and said carriage, actuating means for simultaneously reciprocating said carriage and for effecting predetermined cyclic movements of said fruit handling devices, said cyclic movements comprising presenting the vacuum cups on opposite sides of an article of fruit while the parts of the fruit handling devices are extended, retention of the vacuum cups in such position while the carriage is moved towards the burrs, movement of the vacuum cups away from each other, swinging of the vacuum cups about the pivotal connection of said devices to said carriage to positions in alinement with said burrs, and the returning of said vacuum cups to said first mentioned positions following a juicing operation, and means serving to successively present and halve articles of fruit for engagement by said vacuum cups.

2. In a fruit juice extractor, a pair of spaced rotatable burrs, a carriage adapted to reciprocate toward and away from said burrs, a pair of fruit handling devices pivotally supported by said carriage, each of said devices including a fruit engaging vacuum cup, a knife, means for presenting an article of fruit for impalement upon the knife, actuating means serving to effect cyclic movement of said fruit handling devices, the cyclic movement of said fruit handling devices starting from a position of said vacuum cups on opposite sides of an impaled article of fruit, after which the vacuum cups are swung outwardly in opposite directions to present the fruit halves to the burrs.

3. In a fruit juice extractor, a pair of spaced rotary burrs, a member adapted to have relative reciprocating movement with respect to the burrs, toward and away from the same, a pair of fruit handling devices supported by said member, each of said handling devices including a pair of parts slidably connected together, a vacuum cup carried by one of said parts, and a pivotal connection between the other of said parts and said member, actuating means for simultaneously effecting said reciprocating movement and for effecting predetermined cyclic movements of said fruit handling devices, said cyclic movements comprising presenting the vacuum cups on opposite sides of an article of fruit while the parts of the fruit handling devices are extended, retention of the vacuum cups in such position while the member is approaching the burrs, movement of the vacuum cups away from each other, swinging of the vacuum cups about said pivotal connection to positions in alinement with said burrs, and the returning of said vacuum cups to said first mentioned positions following a juicing operation, and means serving to successively present and halve articles of fruit for engagement by said vacuum cups.

4. In a fruit juice extractor, a fruit handling device, said device comprising two slidably engaging parts, a vacuum cup carried by one of said parts, means serving to carry the other of said parts for pivotal swinging movement, means serving to alternately apply a vacuum and pneumatic pressure to said vacuum cup, and means for effecting relative sliding movement between said parts to extend and retract said cup laterally of the axis of such swinging movement.

5. In a fruit juice extractor, a stationary knife, means for impaling an article of fruit on the knife, a pair of spaced rotatable burrs positioned on opposite sides of the plane of the knife and faced in the direction of the edge of the knife, both said burrs having their axes of rotation in the same plane, a pair of fruit handling devices, means for supporting said devices for pivotal movement in opposite directions about axes parallel to and on opposite sides of the plane of the knife, means for effecting cyclic actuation of said devices, the cyclic actuation including gripping of the two halves of an article of fruit while the article of fruit is impaled on the knife, followed by swinging movement in opposite directions to bring both halves of said fruit into alinement with the axes of said burrs, and means for effecting relative reciprocating movement between the burrs and the gripped halves of the fruit while said halves are in such alined position.

6. In a fruit juice extractor, a stationary knife, means for impaling an article of fruit on the knife, a pair of spaced rotatable burrs positioned on opposite sides of the plane of the knife and faced in the direction of the edge of the knife, both said burrs having their axes of rotation in a common plane, a pair of fruit handling devices, each of said devices including a fruit-retaining vacuum cup, means for supporting said devices for pivotal movement in opposite directions upon axes parallel to and on opposite sides of the plane of the knife, means for effecting cyclic actuation of said devices, the cyclic actuation including gripping of the two halves of an article of fruit while the article is impaled on the knife followed by swinging movement of the devices in opposite directions to bring both halves of the fruit into alinement with the axes of said burrs, and means for effecting relative reciprocating movement between the burrs and the gripped halves of fruit while the halves are in such alined position.

7. In a fruit juice extractor, a knife, means for effecting impalement of an article of fruit on the knife, a pair of spaced rotatable burrs positioned on opposite sides of the plane of the knife, both said burrs having their axes of rotation in the same plane, a pair of fruit handling devices, means for supporting said devices for pivotal movement in opposite direction upon axes parallel to and on opposite sides of the plane of the knife, means for effecting cyclic actuation of said devices, the cyclic actuation including gripping of the two halves of an article of fruit while the article of fruit is impaled on the knife, followed by swinging movement in opposite directions to bring both halves of said fruit into alignment with the axis of said burrs, and means for effecting relative reciprocating movement between the burrs and the gripped halves of the fruit while said halves are in such aligned position.

HAROLD F. WATKINS.